(12) United States Patent
Fukushima et al.

(10) Patent No.: US 6,406,177 B1
(45) Date of Patent: Jun. 18, 2002

(54) WRIST WATCH BAND ADJUST PIN, METHOD OF MANUFACTURING THE PIN, AND WRIST WATCH BAND CONNECTION STRUCTURE

(75) Inventors: Nobuto Fukushima, Sayama; Kouji Fujii, Tokorozawa; Takeo Komiyama, Higashikurume; Toshiaki Hara, Urawa, all of (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 0 days.

(21) Appl. No.: 09/485,829

(22) PCT Filed: Jun. 17, 1999

(86) PCT No.: PCT/JP99/03228

§ 371 (c)(1),
(2), (4) Date: Apr. 12, 2000

(87) PCT Pub. No.: WO99/65354

PCT Pub. Date: Dec. 23, 1999

(30) Foreign Application Priority Data

Jun. 18, 1998 (JP) ............................................. 10-170777

(51) Int. Cl.⁷ ............................. F16G 13/00; A44C 5/02
(52) U.S. Cl. .................. 368/281; 368/282; 24/265 WS; 59/80; 59/901; 224/168
(58) Field of Search ................................ 368/281, 282; 224/168, 173, 174, 175, 177, 180; 24/265 WS, 33 F, 33 P; 59/78, 80, 82, 901

(56) References Cited

U.S. PATENT DOCUMENTS

| 1,721,100 | A |   | 7/1929  | Perret, Jr. |
| 2,737,843 | A | * | 3/1956  | Koehl ............................ 411/479 |
| 2,850,783 | A | * | 9/1958  | Megar ...................... 24/265 WS |
| 2,871,655 | A | * | 2/1959  | O'Larte et al. .............. 224/175 |
| 3,026,670 | A | * | 3/1962  | Burkhardt ....................... 59/80 |
| 3,332,592 | A | * | 7/1967  | Burkle ................... 24/265 WS |
| 3,453,821 | A | * | 7/1969  | Kian ............................ 224/175 |
| 3,601,977 | A | * | 8/1971  | Kunzmann ................... 224/175 |
| 3,837,163 | A | * | 9/1974  | Fujimori ........................... 63/4 |
| 4,220,052 | A | * | 9/1980  | Sheldon ....................... 474/207 |
| 4,263,779 | A | * | 4/1981  | Petershack ................... 474/206 |
| 4,300,346 | A | * | 11/1981 | Kugler ........................ 224/175 |

(List continued on next page.)

FOREIGN PATENT DOCUMENTS

| EP | 0 234 406    | 9/1987  |
| GB | 2 056 258 A  | 3/1981  |
| JP | 51-14392     | 5/1976  |
| JP | 58-27505     | 2/1983  |
| JP | 58-131714    | 9/1983  |
| JP | 63-153813    | 10/1988 |
| JP | 63-163616    | 10/1988 |
| WO | WO 97/03294  | 1/1997  |

*Primary Examiner*—Vit Miska
*Assistant Examiner*—Jeanne-Marguerite Goodwin
(74) *Attorney, Agent, or Firm*—Armstrong, Westerman & Hattori, LLP

(57) ABSTRACT

An adjust pin (1) for connecting a plurality of blocks (2) to each other to make up a wrist watch band (3) is formed of a metal with a property having a superelastic region where a stress remains constant against variation in strain. The adjust pin (1) is provided with a bent part (5) for causing a bending stress in the superelastic region to act on the inner wall face of a connecting through-hole (2a) of a block (2) in a state wherein the block (2) is joined with an adjoining block (2). When the adjust pin (1) is inserted in the blocks (2), and the bent part (5) is positioned in the connecting through-hole (2a), the bent part (5) provides a force acting on the inner wall of the connecting through-hole (2a) by the agency of the bending stress in the superelastic region, thereby securely holding the adjust pin (1) by a spring force thereof.

14 Claims, 14 Drawing Sheets

U.S. PATENT DOCUMENTS

| | | | | |
|---|---|---|---|---|
| 4,458,478 A | * | 7/1984 | North | 224/175 |
| 4,674,803 A | * | 6/1987 | Sterwerf, Jr. | 299/82 |
| 4,717,206 A | * | 1/1988 | Sterwerf, Jr. | 299/82 |
| 4,840,044 A | * | 6/1989 | Scholpp | 59/80 |
| 5,154,047 A | * | 10/1992 | Takagi | 59/80 |
| 5,617,377 A | | 4/1997 | Armstrong | |
| 5,660,308 A | * | 8/1997 | Bert | 24/265 WS |
| 5,951,193 A | * | 9/1999 | Yamamoto et al. | 368/282 |
| 6,053,630 A | * | 4/2000 | Polansky et al. | 368/281 |
| 6,168,309 B1 | * | 2/2001 | Pantet | 368/282 |
| 6,234,791 B1 | * | 5/2001 | Cleary et al. | 433/18 |

* cited by examiner

WRIST WATCH BAND ADJUST PIN, METHOD OF MANUFACTURING THE PIN, AND WRIST WATCH BAND CONNECTION STRUCTURE

TECHNICAL FIELD

The invention relates to an adjust pin for connecting a plurality of blocks of a wrist watch band with each other in a chain like shape, a method of manufacturing the same, and a wrist watch band connection structure using the plurality of the blocks.

BACKGROUND TECHNOLOGY

As is generally known, a wrist watch is provided with a band so as to be worn on the wrist and so forth of a user. A tanned skin, for example, cattle, alligator, etc., cut in a strap-like shape, stitched together with a leather of different quality, overlaid thereon, for reinforcement, is generally used for the band of the wrist watch.

Also, there is available another wrist watch band called a metal band, made up of metal blocks, etc., connected together in a chain-like shape using pins called adjust pins, so that the blocks connected in a strap-like shape can be bent around the shape of the arm of a user. Additionally, there has recently become available yet another wrist watch band called a plastic band formed of a synthetic resin such as urethane, and so forth in a strap-like shape.

Either of these wrist watch bands is generally made up of two pieces of strap-like members, and one end of the respective strap-like members is connected with a body of a wrist watch, including a display part, while the other end thereof is connected with each other by means of a catch or the like.

When the wrist watch is worn on the wrist of a user, the wrist watch is placed on the wrist, and the two pieces of the strap-like members are connected with each other by the catch, thereby keeping the wrist watch from falling off the arm.

For the catch, a buckle is mainly used in the case of the leather band and the plastic band while a connecting member called a clasp is often used in the case of the metal band.

The size of a user's wrist portion varies from person to person due to differences in individuals. Accordingly, a wrist watch band is normally made up so as to be adjustable in length within a given scope of length.

For example, in the case of the leather band, one of the two pieces of strap-like members is provided with a plurality of holes opened in succession at intervals in the longitudinal direction, and the other one is provided with a positioning bar (buckle tongue) which is to be inserted into one of the holes described, disposed at a position such that a length of the leather band is fixed at an optimum length.

With the metal band, a length thereof is generally adjusted by increasing or decreasing the number of blocks, and when adjusting the length of the metal band, the blocks are disconnected from each other by extracting the adjust pin.

A conventional mechanism for adjusting the length of the wrist watch band using the blocks is described hereinafter with reference to FIGS. 25 and 26.

FIG. 25 is a perspective view showing an example of a wrist watch provided with a metal band made up of metal blocks connected with each other.

A wrist watch band 103 made of metal, attached to the wristwatch, comprises two braces 105, 106, each formed in a strap-like shape by arranging a plurality of blocks 102, made of a metal, in chain-shape, and by connecting the blocks 102 with each other by means of a connecting pin shown in FIG. 26, that is, an adjust pin 111.

The brace 106 is provided with a clasp 107 functioning as a connecting fixture at an open end thereof, and the clasp 107 is structured so as to connect the brace 106 with the brace 105.

With the wrist watch band 103, the number of the blocks 102 is increased or decreased by extracting and inserting the adjust pins 111 when adjusting the length thereof.

A mechanism for adjusting the length of the wrist watch band 103 by extracting and inserting the adjust pins 111 is described hereinafter with reference to FIG. 26.

For example, in the case of lengthening the wrist watch band 103, the adjust pin 111 in place at a portion of the wrist watch band 103, to be extended, is extracted, an additional block 102C is disposed between the blocks 102A and 102B, the adjust pin 111 is inserted into a connecting through-hole of a protrusion of the additional block 102C through a connecting through-hole 102a of the block 102A, and another adjust pin 111 passed through another connecting through-hole formed in the block 102C is inserted into a connecting through-hole 102c of a protrusion of the block 102B, thereby connecting the blocks 102A and 102C, and the blocks 102C and 102B, respectively.

On the contrary, in the case of shortening the wrist watch band 103, the adjust pins 111, 111, in place on both sides of a block which is to be removed, for example, the block 102C, are pulled out, and the block 102C is removed before connecting the blocks 102A and 102B again by means of the adjust pin 111.

When inserting the adjust pin 111 into the connecting through-holes of the blocks 102 to connect the adjoining blocks 102A and 102B to each other, the adjust pin 111 has to fit tightly into the connecting through-holes of the blocks 102 to prevent it from falling off after the insertion thereof.

However, a strong force required to fit the adjust pin into the respective blocks is contradictory to a necessity of extracting and inserting the adjust pin with ease when adjusting the length of the wrist watch band.

Consequently, since it has been impossible in the past to satisfy both needs at the same time, priority has been given to prevention of the adjust pin from falling off such that a fitting force required of the adjust pin is normally strengthened at the expense of ease with which the adjust pin is extracted. That is, the outside diameter of the adjust pin is designed at a size at which the adjust pin fits tightly (by large spring force as well as frictional force) into the connecting through-holes of the respective blocks.

As a result, inconvenience has been encountered in adjusting the length of the wrist watch band because the adjust pins can not be extracted and inserted with ease.

Meanwhile, there is available an adjust pin 121 of a split-pin type, as shown in FIG. 27. This adjust pin 121 is formed by folding back a metal wire semicircular in section such that a circular shape in section is formed as a whole by causing flat faces of the metal wire to be folded in half and to face each other. A curved section thereof is formed by causing a portion on both sides of the adjust pin 121, in the longitudinal direction, to swell outwardly, so that the ease with which the adjust pin 121 can be extracted out of a connecting through-hole 102a of a block 102, and reliability of the adjust pin 121 fitting into the connecting through-hole 102a can be obtained by the agency of elasticity of the curved section.

In general, an adjust pin of this type is manufactured by press working, but if material with a high restoring force is used for a constituent material of the adjust pin, press working can not be applied. Accordingly, the normal practice is to use material with a relatively low restoring force. Consequently, a fitting force of the curved section had to be designed on a stronger side at the expense, to a degree, of ease with which the adjust pin can be extracted from the block.

Further, in designing an outside diameter of an adjust pin of the split-pin type such as this, a bore of connecting through-holes of respective blocks into which the adjust pin is inserted, and a height of the curved section of the adjust pin, there have been needs of taking account of working fluctuation, wear and tear caused by extracting and inserting the adjust pin, and so forth. Accordingly, the bore of the connecting through-holes of the respective blocks have been often designed at a value on a fairly smaller side in a relative sense.

As a result, there have been times when it has become difficult to extract and insert the adjust pin and the adjust pin has undergone deformation when a fairly strong force is applied thereto to extract the adjust pin.

Further, the curved section is formed by simply folding back a metal wire semicircular in section in half so as to cause the flat faces of the metal wire folded to face each other, and is therefore susceptible to deformation. Consequently, due to deformation occurring to the curved section upon extracting and inserting the adjust pin, there has occurred misalignment of semicircular portions of the adjust pin at the juncture thereof, at one end (the upper end in FIG. 27) of the adjust pin.

With the adjust pin in such a state, the extraction force of the adjust pin has been drastically reduced, and in an extreme case, no fitting force at all has been developed, so that the adjust pin may have lost its function completely.

Further, the spring bar for purposes of connecting blocks of a wrist watch band with each other, formed of a shape-memory alloy (which has a superelastic property), has been described in Japanese Patent Laid-Open Publication No. 58-27505.

However, this spring bar is nothing but one in a shape with a pin-like piece protruded at both ends, formed of a shape memory alloy, and since no description has been made on that superelasticity is utilized for holding together blocks of a wrist watch band.

As described above, with all conventional adjust pins and wrist watch band connection structures, problems have been encountered. As priority has been given to the force required to fit the adjust pins into the respective blocks. Therefore the adjust pin could not be extracted or inserted with ease at times, or connection of band blocks with each other could not be ensured at times.

DISCLOSURE OF THE INVENTION

The present invention has been developed against such a technical background. One object of the invention is to provide an adjust pin capable of connecting a plurality of blocks together in the form of a chain with a certainty of fitting the pins into connecting through-holes formed in the blocks with a strong force, while enabling the insertion and extraction thereof to be executed with ease when adjusting the length of the wrist watch band, and a wrist watch band connection structure using the adjust pin.

Another object of the invention is to provide a method of manufacturing the adjust pin with ease.

To this end, the invention provides a wrist watch band adjust pin for connecting together a plurality of blocks of a wrist watch band made up of a plurality of blocks connected to each other in the form of a chain, wherein the adjust pin is formed of a metal with a property having a superelastic region where the stress remains constant against variation in strain, and provided with a curved section (bent part) formed at least at one spot thereof, for causing the stress in the superelastic region to act on adjoining blocks in a state wherein the adjoining blocks are connected to each other.

The adjust pin made up as described above, in a condition wherein the same is inserted in connecting through-holes formed in the adjoining blocks, is in a state of the bent part thereof pressing the inner wall face of the connecting through-holes, whereupon the adjust pin is securely held by a developed frictional force.

When the adjoining blocks are connected to each other by the adjust pin as stated above, a spring force acting on the inner wall face of the connecting through-holes becomes constant even if there is fluctuation in the bore of the connecting through-holes or the dimensions of the adjust pin, because a stress occurring on the bent part of the adjust pin remains within the superelastic region where the stress remains constant in spite of variation in strain.

Accordingly, without the need for designing in an advance fitting of the adjust pin into the connecting through-holes of the adjoining blocks in a tighter fashion to allow for working errors, and wear and tear, the adjust pin can be extracted out of and inserted into the connecting through-holes of the adjoining blocks with ease while stable fitting thereof can be effected.

The metal which has superelasticity, for use in the adjust pin is preferably an alloy composed mainly of nickel-titanium (NiTi) or nickel-titanium-cobalt (NiTiCo).

The bent part may be a portion of the adjust pin, bent into a bow shape, so that the bow portion can be fitted onto the inner wall face of the connecting through-holes formed in the adjoining blocks so as to be secured thereto. Further, the adjust pin is preferably provided with a curved surface formed by rounding both longitudinal ends into a semi-spheric shape.

In that case, even if the adjust pin has a property of high hardness, such a construction can prevent the tip of the adjust pin from shaving the inner wall face of the connecting through-holes when inserting the adjust pin into the connecting through-holes of the adjoining blocks.

Further, it is preferable that the adjust pin is in the range of 0.8 mm to 1.2 mm in wire diameter, and is provided with the bent part having a length in the range of 1 mm to 3.7 mm from a position thereof, on the side in contact with one of the adjoining blocks connected together, where the bent part starts bending, to a position thereof, at the maximum height ($H_{max}$), along the horizontal direction.

The invention further provides a method of manufacturing the adjust pin, comprising steps of bending at least one spot of the wire made of a metal having a superelastic region by a press, cutting off the wire to a length so as to include a bent region thereof, and rendering both longitudinal ends of the wire a curved-surface shape.

The invention also provides a method of manufacturing the adjust pin, comprising steps of cutting off a wire made of a metal having a superelastic region to a desired length, bending at least one spot of the wire cut off by use of a press, and rendering both longitudinal ends of the wire a curved-surface shape.

The invention further provides a wrist watch band connection structure for connecting a plurality of blocks to each other in chain-like shape. Wherein the plurality of the blocks are each provided with a recess formed on one edge thereof in the direction of a chain of a wrist watch band, and a protrusion formed on the other edge thereof, on the opposite side, so as to be fitted into a recess of an adjoining block. And a connecting through-hole formed in a pair of arms of the blocks, separated by the recess, running along the direction of the width of the wrist watch band, respectively, and a connecting through-hole of a protrusion, provided in the protrusion, formed to run in the direction parallel with the connecting through-hole formed in the pair of the arms. And wherein by inserting the adjust pin made of a metal having a superelastic region where a stress remains constant against variation in strain into the connecting through-hole of the arms and the connecting through-hole of the protrusion, respectively, in a state wherein the protrusion of one of the blocks is fitted into the recess of another of the blocks, adjoining to the former, the blocks adjoining to each are detachably connected to each other.

That is, the wrist watch band connection structure is further constituted such that the adjust pin is provided with a bent part formed so as to have the maximum height thereof greater than the bore of the connecting through-hole formed in one of the pair of the arms. When the adjust pin is inserted up to a given position into the connecting through-hole formed in the pair of arms and the connecting through-hole of the protrusion, a stress occurring to the bent part of the adjust pin due to the bent part of the adjust pin undergoing flexure inside one of the connecting through-hole is designed to fall within the superelastic region, so that the adjust pin is secured to the adjoining blocks by a force of the stress.

An enlarged bored section is preferably formed at least on the inlet side of the connecting through-hole in one of the pair of the arms such that dimensions between the inner wall faces thereof, opposite to each other in the diametrical direction, is rendered larger than the diameter of the connecting through-hole of the protrusion.

Further, the enlarged bored section is preferably a stepped bored section formed at least on the inlet side of the connecting through-hole of one of the pair of the arms such that dimensions between inner wall faces thereof, opposite to each other in the diametrical direction, is rendered larger than the diameter of the connecting through-hole of the protrusion.

Furthermore, the enlarged bored section may be formed throughout the entire region of the connecting through-hole of one of the pair of the arms, and the connecting through-hole in one of the arms may be formed so as to have a bore such that, when the adjust pin is inserted up to a given position into the connecting through-hole formed in the pair of the arms and the connecting through-hole of the protrusion, a stress occurring to the bent part of the adjust pin due to the bent part of the adjust pin undergoing flexure inside the connecting through-hole formed in one of the arms falls within the superelastic region, enabling the adjust pin to be secured to the adjoining blocks by a force of the stress while the connecting through-hole in the other of the pair of the arms may be formed so as to have a bore slightly larger than the wire diameter of the adjust pin.

The adjust pin is preferably formed of an alloy composed mainly of nickel-titanium (NiTi) or nickel-titanium-cobalt (NiTiCo).

Further, it is preferable that the adjust pin of the wrist watch band connection structure also is in the range of 0.8 mm to 1.2 mm in wire diameter, and is provided with the bent part having a length in the range of 1 mm to 3.7 mm from a position thereof, on the side in contact with one of the adjoining blocks connected together, where the bent part starts bending, to a position thereof, at the maximum height (Hmax), along the horizontal direction.

Furthermore, with the wrist watch band connection structure, the bent part of the adjust pin is preferably formed by bending at a high temperature, or by applying heat treatment to the adjust pin after bending at a low temperature.

BRIEF DESCRIPTION OF THE DRAWINGS

FIG. 13 is a view in front elevation and side elevation showing an example of a keyway-like shape section as an enlarged bored section described in the embodiment of the invention shown in FIG. 9.

FIG. 14 is a schematic illustration showing an example of an apparatus for measuring the spring property of a bent part of the adjust pin.

FIG. 27 is a perspective view illustrating a conventional adjust pin of a split-pin type.

BEST MODE FOR CARRYING OUT THE INVENTION

Embodiments of the invention are described hereinafter by way of example with reference to the accompanying drawings in order to explain the invention in greater detail.
First Embodiment: FIGS. 1 to 4

Figure 1:
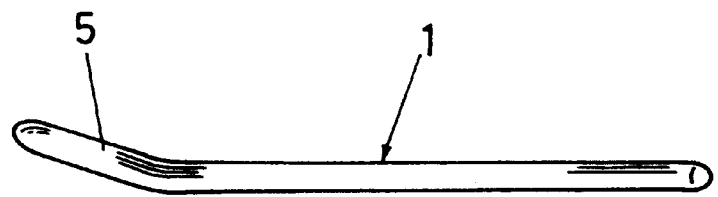
FIG. 1 is a front view of a first embodiment of a wrist watch band adjust pin according to the invention.
Figure 2:
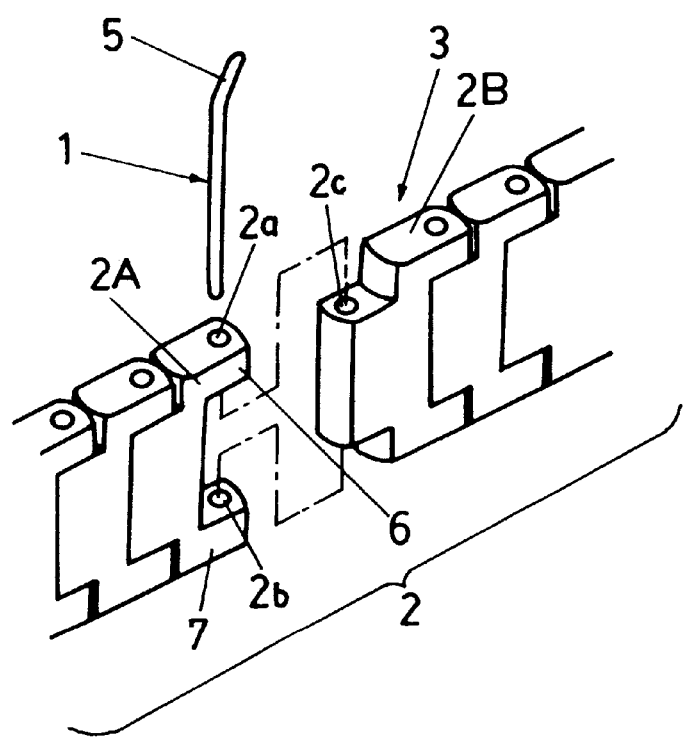
FIG. 2 is a perspective view showing an application example of the wrist watch band adjust pin.

FIG. 1 is a front view of a first embodiment of a wrist watch band adjust pin according to the invention. FIG. 2 is a perspective view showing an application example of the wrist watch band adjust pin, and FIG. 3 is a longitudinal sectional view showing a state wherein the wrist watch band adjust pin is inserted in a connecting through-hole formed in respective blocks of a wrist watch band.

The wrist watch band adjust pin 1 (referred to merely as an "adjust pin" hereinafter) shown in FIG. 1 is a connecting member for connecting a plurality of band blocks 2 (referred to as a "block" hereinafter) together in a chain-like shape as shown in FIG. 2, making up the wrist watch band 3. The adjust pin 1 is inserted into block holes, that is, connecting through-holes 2a, 2b, formed in block 2A, and another block hole, that is, a connecting through-hole 2c of a protrusion, formed in block 2B adjoining block 2A, so as to connect these blocks 2 together, and other blocks 2 adjoining to each other are connected together similarly by an adjust pin 1, respectively.

Figure 3:
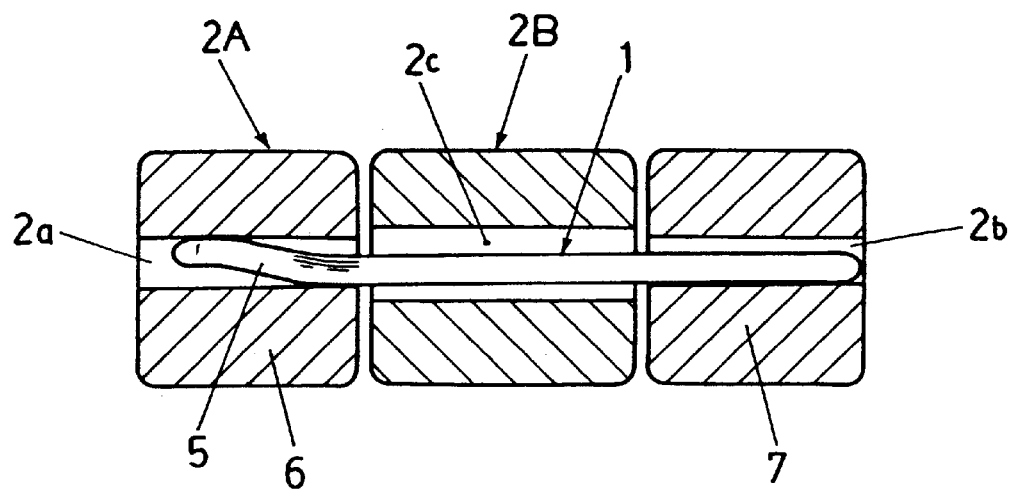
FIG. 3 is a longitudinal sectional view showing a state wherein the wrist watch band adjust pin is inserted in a connecting through-hole formed in respective blocks of a wrist watch band.

The adjust pin 1 has a bent part 5 formed at one spot thereof, functioning as a curved section to cause a stress in a superelastic region, as described in detail hereinafter, to act on the inner wall face of the connecting through-hole 2a of the block 2A in a state wherein the adjoining blocks 2A and 2B are joined together as shown in FIG. 3

With this embodiment of the invention, the bent part 5 is a portion of adjust pin 1, formed by bending the same angularly at one end thereof.

The adjust pin 1 is formed of a superelastic alloy composed mainly of nickel-titanium (NiTi), and is of a size of, for example, 1 mm in diameter and 15 mm in length. Both ends of the adjust pin 1 are worked on by barrel polishing so as to give the pin a curved surface with roundness.

It is generally difficult to work on such a superelastic metallic material by press. However, as the metallic material undergoes plastic deformation when deformed at an acute angle to the plastic deformation region, it is possible to form a bent part 5 at the end of the adjust pin 1.

As described above, the adjust pin 1 is provided with the bent part 5 in such a way as to cause the stress of the superelastic region to act on the inner wall face of the connecting through-hole 2a of the block 2A in a state wherein the adjoining blocks 2A and 2B are joined together, and the stress of the superelastic region is described hereinafter.

Figure 4:
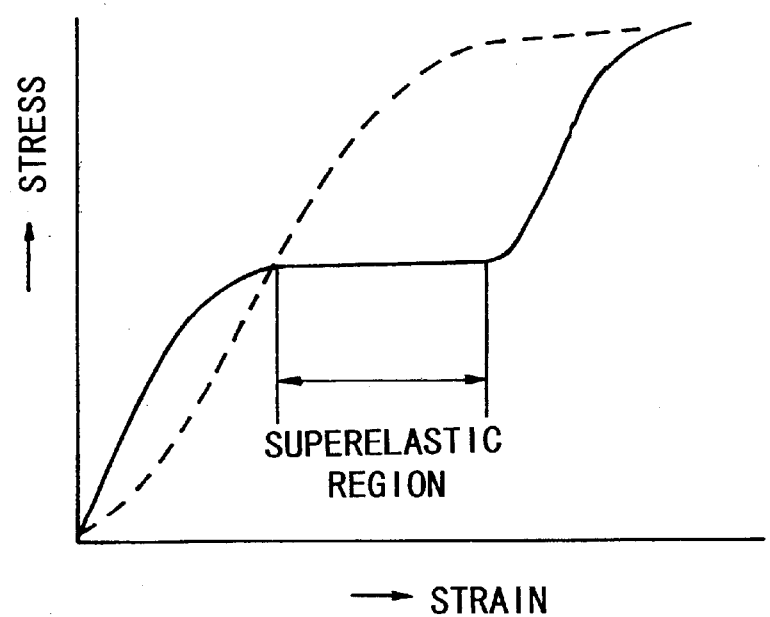
FIG. 4 is a diagram showing a "stress-strain" curve.

In general, a "stress-strain" curve of an elastic material, as shown by a broken line in FIG. 4, indicates that as stress increases, strain increases. However, in the case of a certain metal such as NiTi alloy, there exists a region (superelastic region) where the stress remains constant in spite of an increase in strain as shown by a solid line in FIG. 4. Such a property is called superelasticity, and an alloy having superelasticity is called a superelastic alloy.

The adjust pin 1 described with reference to FIG. 1 is formed of a superelastic alloy having superelasticity.

The bending angle of the bent part 5 is designed such that a stress occurring to the bent part 5 of the adjust pin 1 falls into the superelastic region described with reference to FIG. 4 due to the bent part 5 being bent back by the inner wall face of the connecting through-hole 2a when the block 2A is connected with the block 2B by inserting the adjust pin 1 from one end thereof, on a side remote from the bent part 5, through the connecting through-hole 2a, the connecting through-hole 2c of the protrusion, and the connecting through-hole 2b.

Accordingly, an amount of flexure occurring to the bent part 5 of the adjust pin 1 undergoes a change due to fluctuations in dimensions of the connecting through-hole 2a of the block 2A, and in the bending angle of the bent part 5 of the adjust pin 1, for reasons attributable to working applied thereto, thus causing fluctuation in strain.

However, even if there is fluctuation in the strain, a reaction force (stress) of the adjust pin 1, acting on the inner wall face of the connecting through-hole 2a, remains constant provided that a scope of the fluctuation is within the superelastic region described with reference to FIG. 4, because the adjust pin 1 according to this embodiment has superelasticity. Consequently, even with some fluctuation in a diameter of the connecting through-hole 2a, the reaction force of the bent part 5 is always constant due to the effect of superelasticity, and thereby a force of fitting the adjust pin 1 into the block 2A remains constant, so that stable connection of the block 2A with the block 2B can be effected.

Further, as shown in FIG. 1, the adjust pin 1 has both ends thereof, formed so as to have a curved (semispheric) surface, and this prevents the tip of the adjust pin 1 from shaving the inner surface of the connecting through-hole 2a, 2b and the connecting through-hole 2c of the protrusion when inserting the adjust pin 1 into the connecting through-hole 2a, the connecting through-hole 2c of the protrusion, and the connecting through-hole 2b of the block 2A, 2B, respectively, although the NiTi alloy has high hardness in property.

Thus, since the connecting through-holes 2a, 2b and the connecting through-hole 2c of the protrusion are protected from being damaged, a decline will not occur in the force of fitting the adjust pin 1 into the connecting through-hole 2a even if the extraction and insertion of the adjust pin 1 is repeated. Accordingly, the adjust pin 1 can be prevented from slipping out of the connecting through-hole 2a of the block 2 while a length of the wrist watch band can be adjusted with ease.

Figure 5:
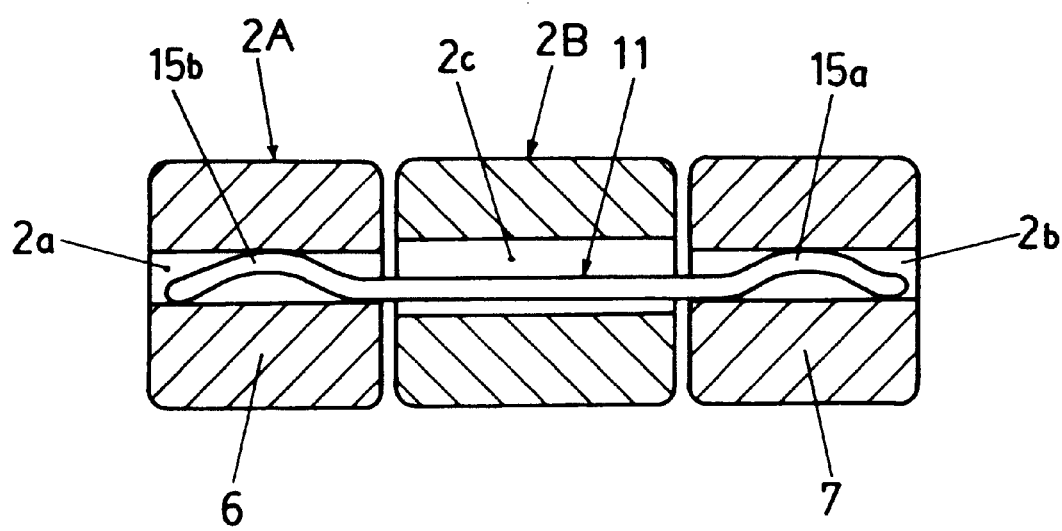
FIG. 5 is a longitudinal sectional view, similar to FIG. 3, showing a condition wherein an adjust pin is inserted in a connecting through-hole formed in respective blocks of a wrist watch band for describing a second embodiment of a wrist watch band adjust pin according to the invention.

Second Embodiment: FIG. 5

A second embodiment of a wrist watch band adjust pin according to the invention is next described with reference to FIG. 5.

FIG. 5 is a longitudinal sectional view, similar to FIG. 3, showing a state wherein an adjust pin is inserted in a connecting through-hole formed in respective blocks of a wrist watch band for illustrating the second embodiment of the wrist watch band adjust pin according to the invention.

The adjust pin 11 according to this embodiment is provided with curved parts 15a, 15b, formed in a curved shape, at both ends thereof, respectively, such that a curved portion of the respective curved parts is fitted onto the inner wall face of connecting through-holes 2a, 2b, of arms 6, 7, respectively, formed on opposite sides of a block 2A so as to be secured thereto.

The adjust pin 11 of this embodiment too is formed of a superelastic alloy having superelastic property, and a height of the curved portion of the curved parts 15a, 15b is designed such that a stress occurring to the curved parts 15a, 15b of the adjust pin 11 falls in the superelastic region described with reference to FIG. 4 due to the curved parts 15a, 15b being bent back by the inner wall face of the connecting through-holes 2a, 2b, respectively, when the adjust pin 11 is inserted up to a given position into the connecting through-holes 2a, 2b, and a connecting through-hole 2c of a protrusion.

Figure 6:
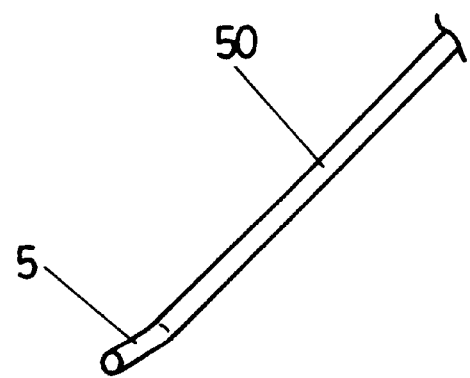
FIG. 6 is a perspective view showing a bending step for a method of manufacturing a wrist watch band adjust pin according to the invention.
Figure 7:
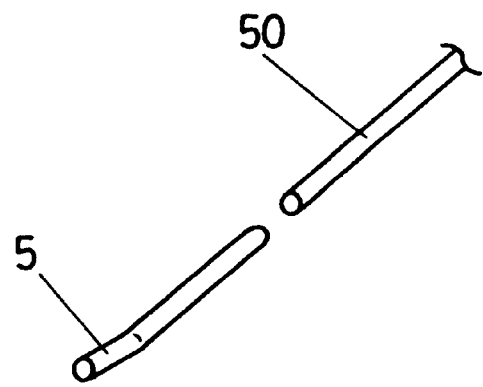
FIG. 7 is a perspective view showing a cutting-off step for the method of manufacturing the wrist watch band adjust pin according to the invention.
Figure 8:
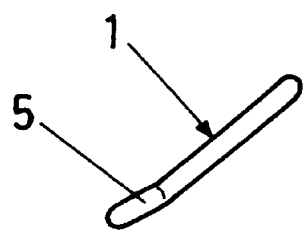
FIG. 8 is a perspective view showing a barrel-polishing step for the method of manufacturing the wrist watch band adjust pin according to the invention.

Third Embodiment: FIGS. 6 to 8

A method of manufacturing a wrist watch band adjust pin according to the invention is next described with reference to FIGS. 6 to 8.

FIGS. 6 to 8 are perspective views showing respective steps of the method of manufacturing the wrist watch band adjust pin according to the invention.

In manufacturing the adjust pin 1 shown in FIG. 1, one end of a superelastic alloy wire 50 (referred to as wire hereinafter) containing NiTi as the main constituent thereof is bent by a press at first as shown in FIG. 6, thereby forming a bent part 5.

Subsequently, the wire 50 with one end thereof bent is cut off to a desired length as shown in FIG. 7, and finally, both ends of the wire cut off are ground by barrel polishing so as to have a semispheric surface with roundness as shown in FIG. 8, respectively, thereby completing the adjust pin 1 as shown in the figure.

When the adjust pin 1 manufactured by the method described above was used for linking together the blocks 2 shown in FIG. 2, a fitting force of the adjust pin 1 as stable as described with reference to the first embodiment, and ease with which the adjust pin 1 can be inserted and extracted was obtained.

As an alternative method of manufacturing the wrist watch band adjust pin according to the invention, a method described hereinafter may also be adopted.

That is, a superelastic alloy wire 50 containing NiTi as the main constituent thereof is at first cut off to a desired length as shown in FIG. 7. Subsequently, one end of the wire 50 cut off is bent by a press as shown in FIG. 6, thereby forming the bent part 5.

Finally, as shown in FIG. 8, both ends of the wire 50 are ground by barrel polishing so as to have a semispheric surface, thereby completing the adjust pin 1.

When the adjust pin 1 manufactured by the method described above was used for linking together the blocks 2 shown in FIG. 2, a fitting force of the adjust pin 1 as stable as described with reference to the first embodiment, and ease with which the adjust pin 1 can be inserted and extracted was obtained in the same way as in the previously mentioned embodiment of the method of manufacturing the wrist watch band adjust pin according to the invention.

Fourth Embodiment: FIGS. 9 to 16

An embodiment of a wrist watch band connection structure according to the invention is described hereinafter with reference to FIGS. 9 to 16.

Figure 9:
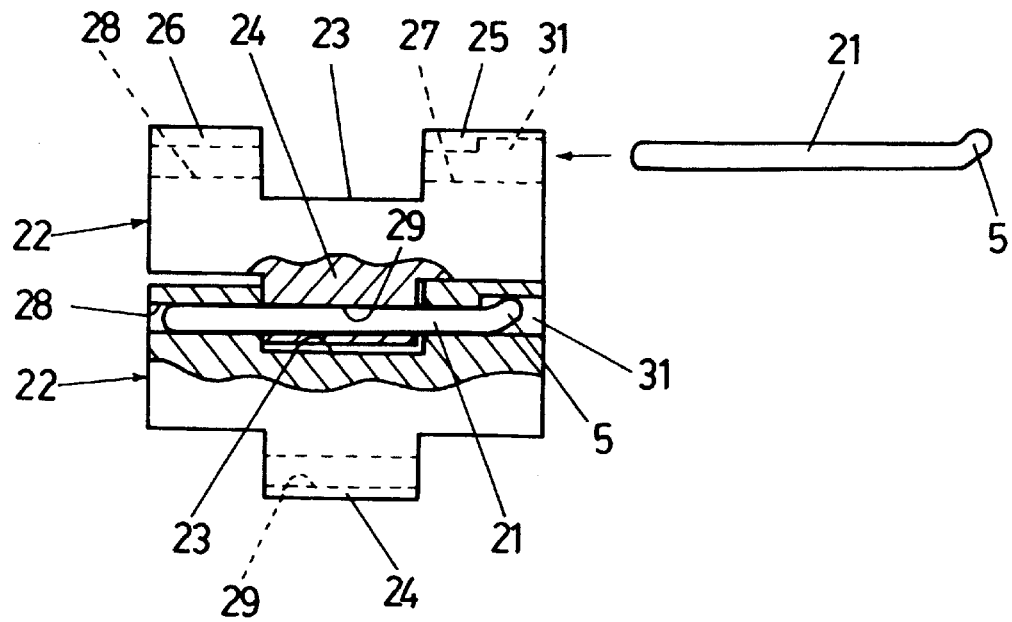
FIG. 9 is a schematic view illustrating a wrist watch band connection structure according to the invention.
Figure 10:
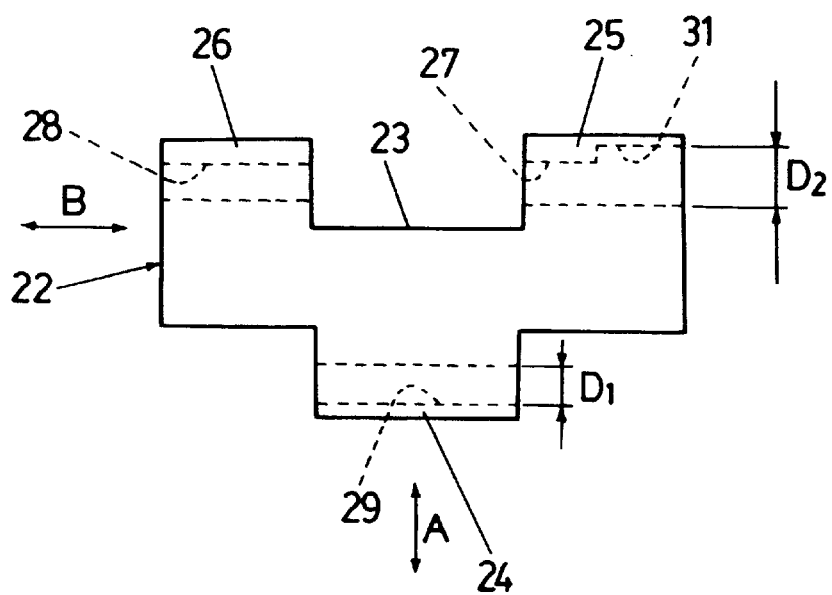
FIG. 10 is a front elevation of a block of a wrist watch band, for use in the wrist watch band connection structure according to the invention.
Figure 11:
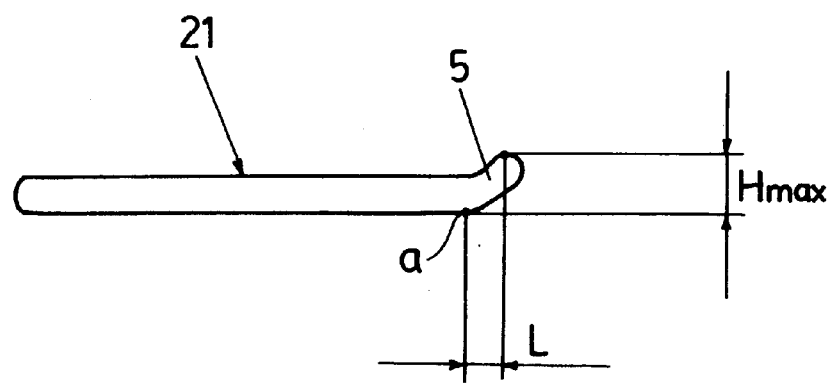
FIG. 11 is a front elevation of an adjust pin for use in the wrist watch band connection structure according to the invention.

FIG. 9 is a schematic view illustrating the wrist watch band connection structure according to the invention. FIG. 10 is a front elevation of a block of a wrist watch band, for use in the wrist watch band connection structure according to the invention, and FIG. 11 is a front elevation of an adjust pin for use in the wrist watch band connection structure according to the invention.

The wrist watch band connection structure is a structure where a plurality of the blocks 22 are connected to each other in a chain-like shape as shown in FIG. 9. The plurality of the blocks 22 are provided with a recess 23 formed on a side of one edge thereof in the direction of a chain, indicated by the arrow A in FIG. 10. While a protrusion 24 formed so as to be fitted into a recess 23 of a block adjoining thereto is provided on a side of the other edge thereof.

Each of the blocks 22 is provided with connecting through-holes 27, 28, running along the direction of the width of the wrist watch band, indicated by the arrow B. They are formed in arms 25, 26 on opposite sides thereof, separated by the recess 23, respectively, while the protrusion 24 too is provided with a connecting through-hole 29 of a protrusion, formed to run in the direction parallel with the connecting through-holes 27, 28.

In the wrist watch band connection structure, an adjust pin 21 is inserted into the connecting through-holes 27, 28 of the arms 25, 26, respectively, and the connecting through-hole 29 of the protrusion in a state wherein the protrusion 24 of one of the blocks 22 is fitted into the recess 23 of another of the blocks 22, adjoining to the former, as shown in FIG. 9, thereby enabling the blocks 22 adjoining to each other to be detachably connected.

As shown in FIG. 10, the arm 25 which is one of a pair of the arms 25, 26, formed in the blocks 22, is provided with a enlarged bored section 31, formed on the inlet side of the connecting through-hole 27. The enlarged bored section 31 is a part of the connecting through-hole 27, where dimensions $D_2$ between the inner wall faces of the connecting through-hole 27, in cross section, opposite to each other in the diametrical direction thereof, is rendered larger than the diameter $D_1$ of the connecting through-hole 29 of the protrusion.

The diameter of the portion of the connecting through-hole 27 excepting the portion of the enlarged bored section 31 is the same as the connecting through-hole 28 and the connecting through-hole 29 of the protrusion.

Meanwhile, as shown in FIG. 11, the adjust pin 21 is formed in the same shape as described with reference to FIG. 1, and is provided with a bent part 5, that is, a curved section formed by bending the adjust pin 21 into the angle-bracket shape. Further, the bent part 5 is formed so as to have the maximum height $H_{max}$ thereof greater than the dimensions $D_2$ between the inner wall faces of the enlarged bored section 31, and the wire diameter of the adjust pin 21 is rendered slightly smaller than the bore of the connecting through-hole 28, and that of the connecting through-hole 29 of the protrusion.

More specifically, for example, the adjust pin 21 is formed to have a wire diameter of 1 mm while the connecting through-hole 28, and the connecting through-hole 29 of the protrusion are formed to have bores in the order of 1.05 mm, so that there is formed a clearance of 0.05 mm between the adjust pin 21 and the inner wall face of the connecting through-hole 28, and also between the adjust pin 21 and the inner wall face of the connecting through-hole 29 of the protrusion.

When the adjust pin 21 is inserted up to a given position in the connecting through-hole 28 on the arm 26 side from the enlarged bored section 31 through the connecting through-hole 29 of the protrusion as shown in the block 22 illustrated in the lower part of FIG. 9, it is designed such that the bent part 5 of the adjust pin 21 undergoes flexure inside the enlarged bored section 31, and thereby a stress occurring to the bent part 5 of the adjust pin 21 falls within the superelastic region as described with reference to FIG. 4.

Figure 12:
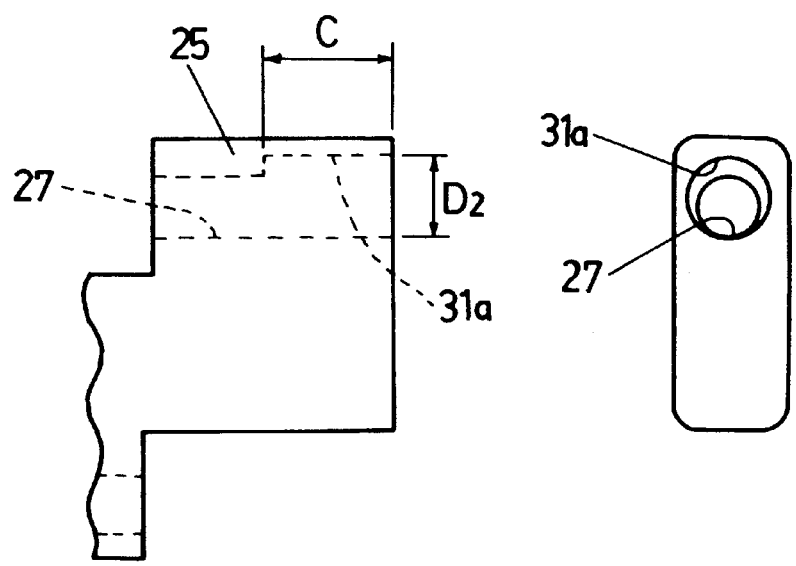
FIG. 12 is a view in front elevation and side elevation showing an example of a stepped bored section as an enlarged bored section described in the embodiment of the invention shown in FIG. 9.
Figure 1:
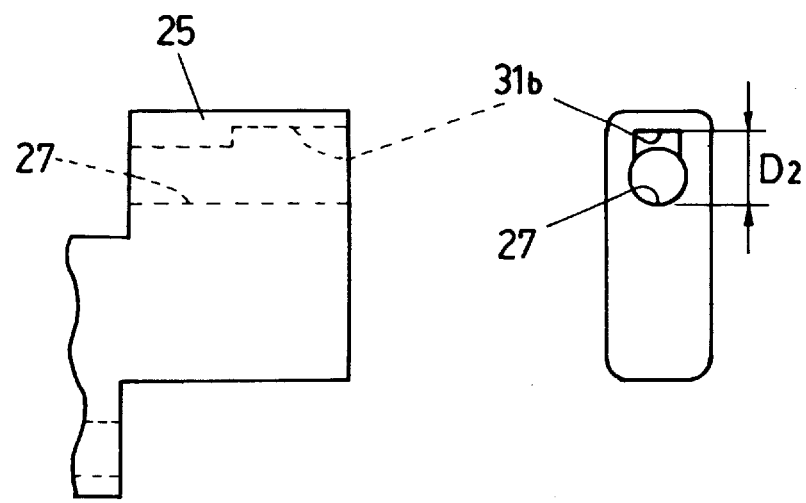
Figure 1:
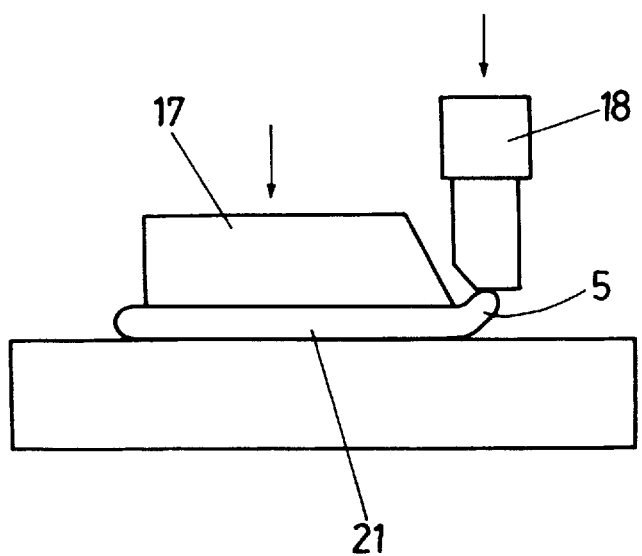

In this connection, the enlarged bored section 31, formed in the connecting through-hole 27, is not limited to a stepped bored section 31a as shown in FIG. 12, but may be an enlarged section 31b with dimensions $D_2$ between the inner wall faces thereof, opposite to each other in the diametrical direction, being enlarged by notching a portion of the inner wall face of the connecting through-hole 27 along the inner periphery thereof into a keyway-like shape as shown in FIG. 13.

In the case where the stepped bored section 31a as shown in FIG. 12 is adopted, the stepped bored section 31a is formed so as to have a smaller bore part, for example, 1.05 mm in bore and a larger bore part, for example, 1.15 mm in bore. Further, the larger bore part is formed to have a depth C thereof larger than a length L of the bent part 5 of the adjust pin 21 as shown in FIG. 11.

The length L of the bent part 5 represents a length in the horizontal direction in FIG. 11 from a region of the bent part 5 in contact with the connecting through-hole 27, where the bent part 5 starts bending, to a region of the bent part 5, at the maximum height $H_{max}$, and the length L needs to be not less than 1 mm.

With the wrist watch band connection structure, since the maximum height $H_{max}$ of the bent part 5 of the adjust pin 21 is rendered larger than the dimension $D_2$ between the inner wall faces of the enlarged bored section 31, when the adjust pin 21 is inserted up to a given position into the connecting through-holes 27, 28, and the connecting through-hole 29 of the protrusion, formed in two blocks 22, 22 to be connected together as shown in FIG. 9, the region of the bent part 5 at the maximum height $H_{max}$ is positioned inside the enlarged bored section 31, and thereby the bent part 5 undergoes deformation such that a height thereof becomes equivalent to the dimension $D_2$ between the inner wall faces of the enlarged bored section 31.

Further, as for a portion of the adjust pin 21, other than the bent part 5, inserted in the connecting through-hole 28, the connecting through-hole 29 of the protrusion, and the smaller bore part of the connecting through-hole 27, there is a clearance of only 0.05 mm between the inner wall face of the respective through-holes and the adjust pin 21 because the above-mentioned through-holes and the adjust pin 21 are formed to have respective dimensions as described in the foregoing. Accordingly, the portion of the adjust pin 21, other than the bent part 5, hardly undergoes deformation, and consequently, a stress acting on the inner wall face of the respective through-holes, caused by the portion of the adjust pin 21, other than the bent part 5, is very small.

It follows therefore that a fixing force of the adjust pin 21 inserted in the block 22, acting on the block 22, is mostly a force occurring due to deformation of the bent part 5 (a portion of the adjust pin 21, on the rightward side of the position a in FIG. 11)

The bent part 5 is preferably formed by bending the adjust pin 21 after heating at a high temperature, or by applying heat treatment to the adjust pin 21 after bending at a low temperature.

More specifically, a wire made of a NiTi alloy which is a shape-memory alloy is used as a constituent material of the adjust pin 21, and a treatment for straight-line shape-memory is applied at a high temperature of 500° C. to the wire before cut off to a given length. Subsequently, one end of the cut-off wire is bent into a angle-bracket shape by a press, and both ends of the cut wire are worked on by barrel polishing such that the surface at the both ends is rounded into a semispheric shape.

In this connection, as a portion of the wire described above, deformed by bending, is turned into the martensite phase in microstructure, if the same is used as it is, this will result in an insufficiency of spring property of the bent part 5. For this reason, in order to bring the microstructure of the portion of the wire, worked on, back to the austenite phase giving superelasticity thereafter, a heat treatment at 500° C. is preferably applied to the wire for a duration of one hour before cooling the same in air or water.

Results of measurement on the maximum height $H_{max}$ (refer to FIG. 11) of the bent part 5 with respect to the adjust pin 21 manufactured as above showed that an average value of the maximum heights $H_{max}$ for twenty pieces of the adjust pin 21 before the heat treatment was 1.693 (standard deviation 0.017), but the same after the heat treatment turned out to be 1.450 (standard deviation 0.014).

This shows that the heat treatment causes a stress to be released, and a springback (a decrease in a $H_{max}$ value) occurs. Accordingly, in designing the maximum height $H_{max}$, the $H_{max}$ value after bending may be designed by taking into account a final shape of a workpiece allowing for variation in shape during the heat treatment and an amount of barrel polishing applied thereto.

Since there is not much difference in fluctuation between the maximum height $H_{max}$ of the bent part of the adjust pin before the heat treatment and after the heat treatment, it can be said that with this manufacturing process, fluctuation due to the working of the workpiece can be sufficiently controlled.

A force occurring as a result of deformation of the adjust pin 21 for use in the wrist watch band connection structure is described hereinafter together with results of tests.

The adjust pin 21 used in the tests was 1 mm in diameter, and 16 mm in length, and was formed to have a bent part 5 with a length L of 2 mm and a maximum height $H_{max}$ of 1.5 mm. An enlarged bored section 31 of a connecting through-hole 27 is the stepped bored section 31a as described with reference to FIG. 12, and the stepped bored section 31a is formed so as to have a larger bore part with a diameter $D_2$ of 1.25 mm.

Accordingly, with the wrist watch band connection structure according to the invention, an amount of deformation which the bent part 5 of the adjust pin 21 undergoes when the adjust pin 21 is inserted into the blocks 22 to be connected to each other can be represented by the following expression: $H_{max}$ (1.5 mm)–$D_2$ (1.25 mm)=0.25 mm. The above value is designed on the basis of measurement results given below.

The spring property of the bent part 5 of the adjust pin 21 is first measured by determining a spring force thereof with the use of a measuring apparatus as shown in FIG. 14.

With the measuring apparatus, a load cell 18 disposed above the bent part 5 of the adjust pin 21 is caused to descend gradually while keeping a longitudinal portion of the adjust pin 21 in a condition securely held by a holding member 17 so as not to cause flexure to occur, whereupon a force acting on the load cell 18 is measured.

Based on the measurement results, a "displacement vs. force" curve with respect to the bent part 5 was prepared.

Figure 15:
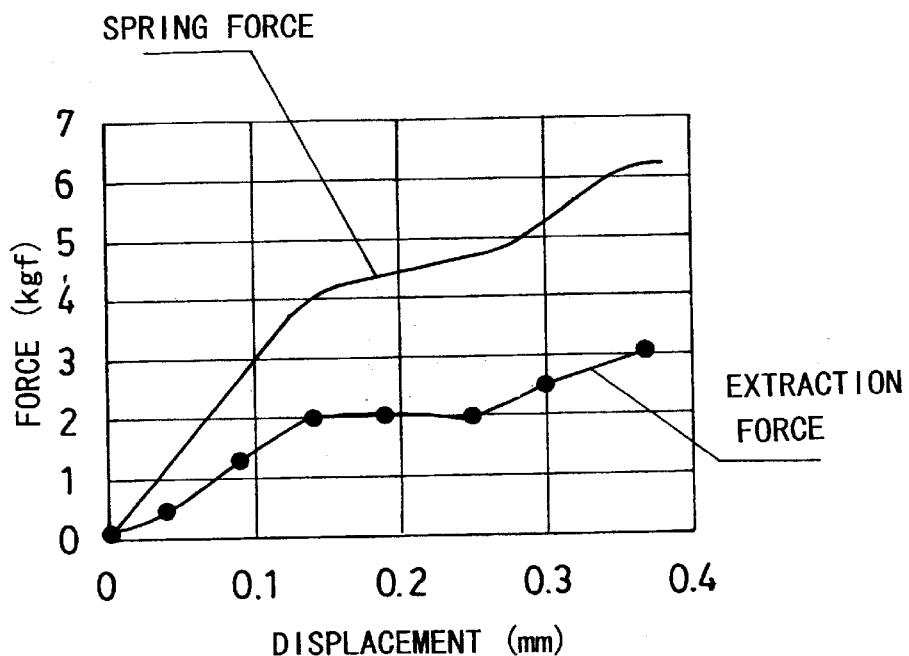
FIG. 15 is a diagram showing results of measurement on the spring property of the bent part of the adjust pin.

FIG. 15 shows the measurement results. According to the measurement results, a spring force as detected by the load cell 18 rises according as displacement of the bent part 5 increases, however, the slope of the "displacement vs. force" curve becomes more gradual at a displacement in the range of about 0.15 mm to 0.3 mm, and becomes steeper again at a displacement of around 0.3 mm and greater.

In this case, the range of about 0.15 mm to 0.3 mm corresponds to the superelastic region described in the foregoing.

Displacement of a spring material when bent as above is naturally uneven as seen in the sectional direction, that is, the closer to the periphery thereof, the greater the displacement, while the closer to the center thereof, the smaller the displacement is. It is assumed therefore that a spring force caused by the displacement corresponds to an integral value for the whole.

Further, a plurality of jigs provided with a larger bore part of differing bores, as is formed in the stepped bored section of respective blocks making up the wrist watch band, are prepared, and results of measurement on an extraction force when the adjust pin inserted in the stepped bored section of the respective jigs is pushed out with the longitudinal portion of the adjust pin, on the opposite side of the bent part, is also shown in FIG. 15.

By comparing the results of such measurements with the above-mentioned data on the spring force, it has been found that there exists a region where the extraction force is fairly stable, ranging from 0.15 mm to 0.3 mm in displacement, corresponding to the superelastic region described previously.

Accordingly, it is evident from the results of the measurement as well that the amount of deformation 0.25 mm of the bent part 5 of the adjust pin 21 falls within the superelastic region.

As the extraction force is equivalent in value to the spring force multiplied by a friction coefficient, the fact that the superelastic region of the spring force corresponds to the superelastic region of the extraction force means that a friction coefficient between the adjust pin 21 and the enlarged bored section 31 of the respective blocks 22 indicates a substantially constant value within the superelastic region.

If the maximum height $H_{max}$ of the adjust pin 21 as shown in FIG. 11 and the dimension $D_2$ in the diametrical direction of the enlarged bored section 31 of the respective blocks 22 as shown in FIG. 10 are designed at optimum values by taking advantage of the above, the bent part 5 of the adjust pin 21 causes a stable spring force in the superelastic region to act on the enlarged bored section 31 of the respective blocks 22, and thereby the extraction force of the adjust pin 21 acting on the respective blocks 22 is rendered substantially constant and stabilized.

Displacement of the bent part 5 with the adjust pin inserted in the stepped bored section 31a of the respective blocks 22 corresponds to a value by subtracting the dimension $D_2$ of the larger bore part of the stepped bored section 31a from the maximum height $H_{max}$ of the bent part 5 of the adjust pin 21.

Equations for calculating dimensions of respective parts of an adjust pin, bores of blocks into which the adjust pin is inserted, and so forth so as to obtain an extraction force as desired are described hereinafter.

The "displacement vs. force" curve shown in FIG. 15 can be inferred from the following assumption:

That is, in the case where a shape in section of a spring material used for the adjust pin is not specified, a spring force P can be calculated by the following equation (1):

$$P = E \cdot I \cdot w \cdot K / \{L^3/3 + kIEL/(AG)\} \qquad \text{Equation (1)}$$

where

E: longitudinal elastic coefficient (5700 kgf/mm² for NiTi)

G: transverse elastic coefficient

I: geometrical moment of inertia w: an amount of flexure

A: cross sectional area

K: correction term k: ratio of a shearing stress on the neutral axis to an average shearing stress L: spring length Further, in the case where a spring material used for the adjust pin is a wire-like material circular in section, a spring force P can be calculated by the following equation (2):

$$P = 3E \pi d^4 w K / 64 L^3 (1 + 0.65 \cdot d^2/L^2) \qquad \text{Equation (2)}$$

where d=wire diameter

Furthermore, an extraction force can be represented by the following equation (3):

$$F = \mu s \cdot P \qquad \text{Equation (3)}$$

where $\mu s$: coefficient of static friction

F: extraction force

Accordingly, assuming that a coefficient of static friction $\mu s$ is substantially constant, it can be said from equation (3) that an extraction force F can be maintained substantially constant provided that the spring force P remains constant. Hence, utilization of the spring force in the superelastic region will result in semi-permanent stabilization of the extraction force.

It is possible to find by calculation the shape of the adjust pin, particularly, the maximum height $H_{max}$ thereof as described with reference to FIG. 11, the wire diameter thereof, the characteristic of the constituent material thereof, the bore of the enlarged bored section 31 of the respective blocks 22, and so forth so as to obtain an extraction force as desired using the equations described in the foregoing.

Results of tests conducted for the purpose of comparing an extraction force of the adjust pin in the case of the wrist watch band connection structure according to the invention as described with reference to FIG. 9, and that in the case of a conventional wrist watch band connection structure using a split pin are described hereinafter with reference to FIG. 16.

Figure 16:
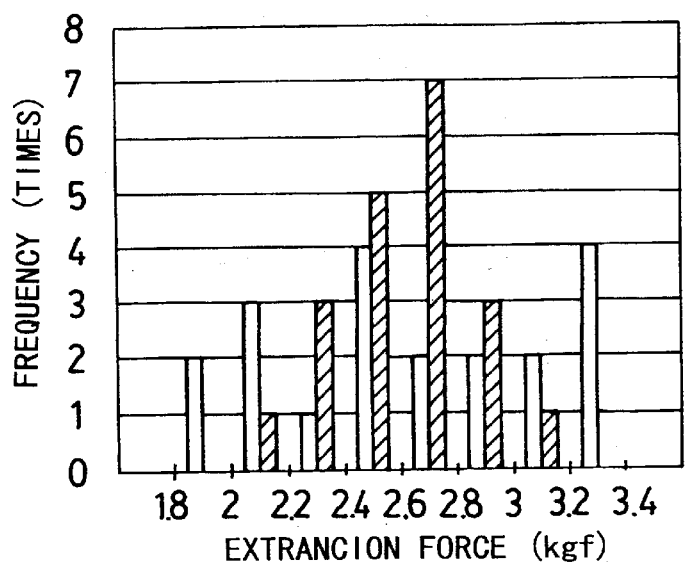
FIG. 16 is a graph showing the results of a test wherein an extraction force of the adjust pin in the case of the wrist watch band. connection structure according to the invention is compared with that in the case of the conventional wrist watch band connection structure using a split pin.

FIG. 16 is a view showing the results of the tests in the form of a graph wherein the extraction force of the adjust pin in the case of the wrist watch band connection structure according to the invention is compared with that in the case of the conventional wrist watch band connection structure using the split pin as described with reference to FIG. 27.

According to the results of the tests, the extraction force of the adjust pin in the case of the conventional structure as shown in a hollow bar graph is found to vary in the range of 1.8 to 3.4 kgf while the extraction force of the adjust pin in the case of the structure according to the invention as shown in a hatched bar graph is found to vary in the range of 2.0 to 3.2 kgf, representing a smaller range of fluctuation of the extraction force.

Further, such fluctuation is in normal distribution, suggesting that fluctuation of the extraction force reflects fluctuation in dimensions of the adjust pin when worked on, that is, fluctuation in the maximum height $H_{max}$ of the adjust pin as described with reference to FIG. 11.

In contrast, fluctuation of the extraction force of the adjust pin in the case of the conventional structure using the split pin is asymmetric against the center of distribution, which is presumably due to effects of something other than the fluctuation in the dimensions of the adjust pin when worked on, for example, the effect of plastic deformation etc.

Figure 17:
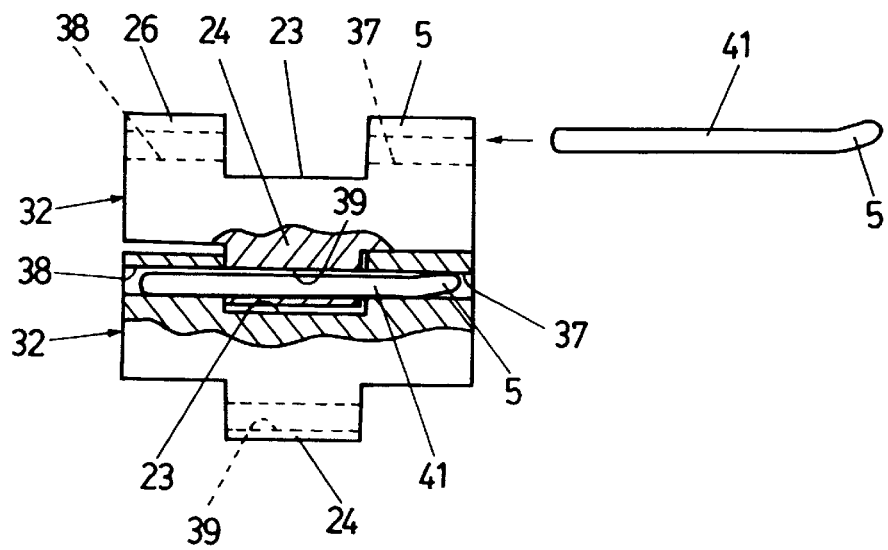
FIG. 17 is a schematic illustration, similar to FIG. 9, illustrating another embodiment of the wrist watch band connection structure according to the invention.

Fifth Embodiment: FIG. 17

Another embodiment of a wrist watch band connection structure according to the invention is described next with reference to FIG. 17.

FIG. 17 is a schematic illustration, similar to FIG. 9, illustrating another embodiment of the wrist watch band connection structure according to the invention, and parts corresponding to those in FIG. 9 are denoted by like reference numerals.

The wrist watch band connection structure according to this embodiment differs from the same according to the embodiment as described with reference to FIG. 9 only in that connecting through-holes 37, 38 and a connecting through-hole 39 of a protrusion, formed in respective blocks 32, all have a bore identical in size throughout the entire length.

With this embodiment, the maximum height $H_{max}$ of an adjust pin 41 as described with reference to FIG. 11 is designed so as not to allow a longitudinal portion of the adjust pin 41, other than a bent portion 5, to undergo flexure, but so as to cause a spring force occurring to the bent portion 5 of the adjust pin 41 to act on an inner wall face of the connecting through-hole 37 with a magnitude of force working in the superelastic region.

In the case of the embodiment explained with reference to FIGS. 9 to 16, since the adjust pin 21 is formed to have the bent part 5 with the length L=2 mm, $D_2$=1.25 mm, and the maximum height $H_{max}$=1.5 mm, the amount of deformation of the bent part 5 when the adjust pin 21 is inserted up to a given position in the respective blocks 22 is 0.25 mm.

In contrast, with this embodiment, the adjust pin 41 is formed to have a bent part 5 with a length L=2 mm, which is the same as for the above case, however, $D_2$=1.05 mm, which is smaller than for the above case, and the maximum height $H_{max}$=1.3 mm, correspondingly smaller than the above case. The amount of deformation is still 0.25 mm, which is the same as that in the case of the embodiment described with reference to FIG. 9. Hence, a spring force of the adjust pin 41, in the superelastic region, is acted on the inner wall face of the connecting through-hole 37 of the respective blocks 32, so that a stable extraction force can be obtained.

Figure 18:
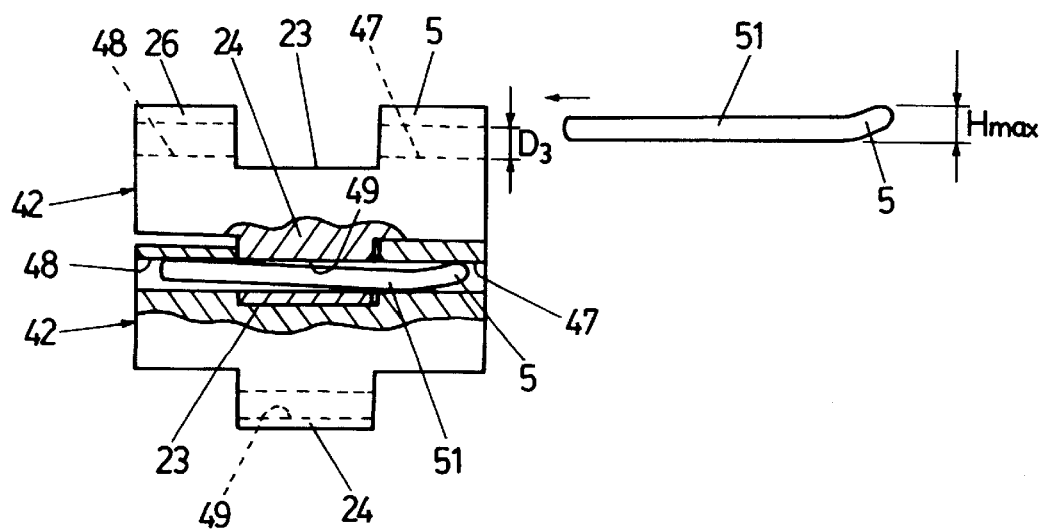
FIG. 18 is a schematic illustration, similar to FIG. 17, illustrating still another embodiment of the wrist watch band connection structure according to the invention.
Figure 19:
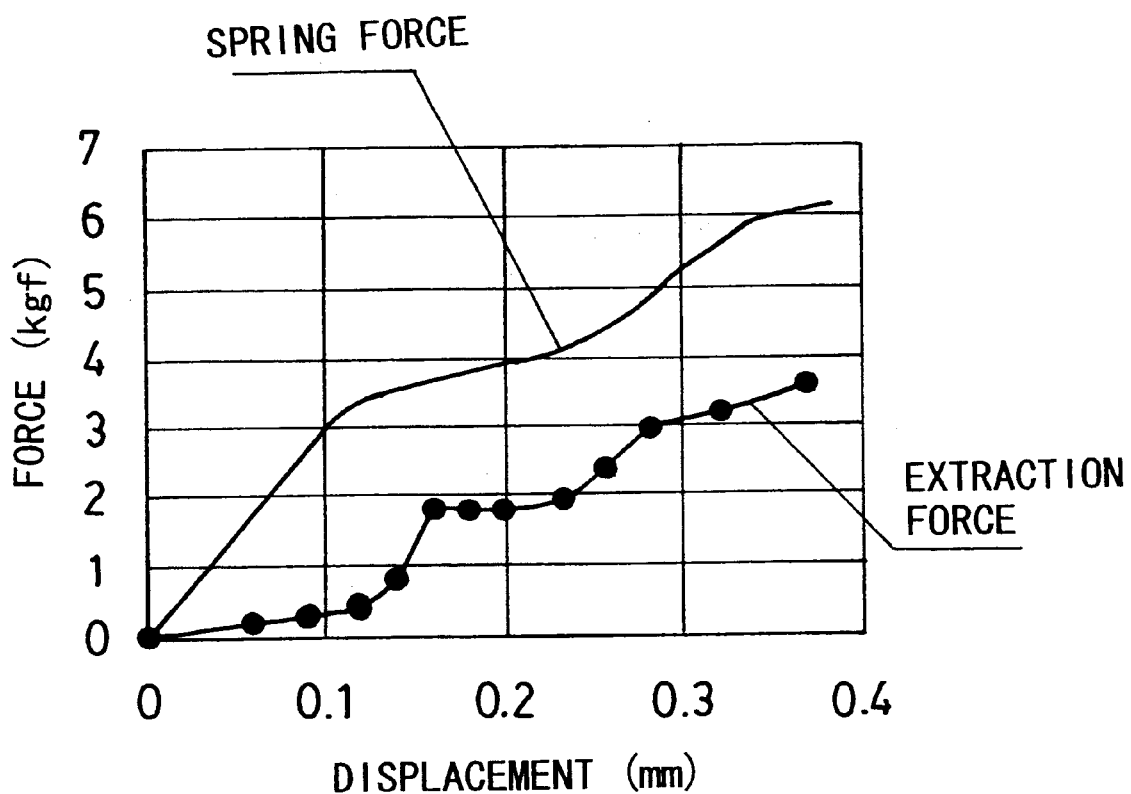
FIG. 19 is a diagram showing the results of measurements on the spring property of a bent part of the adjust pin of the embodiment shown in FIG. 18.
Figure 20:
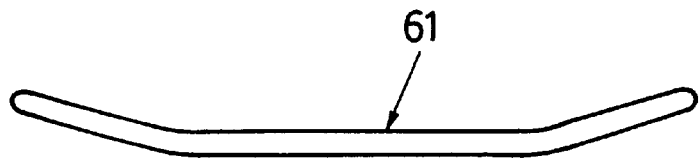
FIG. 20 is a front view of an example of an adjust pin provided with bent parts formed at two spots thereof.
Figure 21:
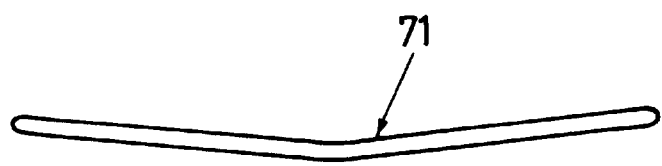
FIG. 21 is a front view of an example of an adjust pin provided with a bent part formed at the center thereof in the longitudinal direction.
Figure 22:
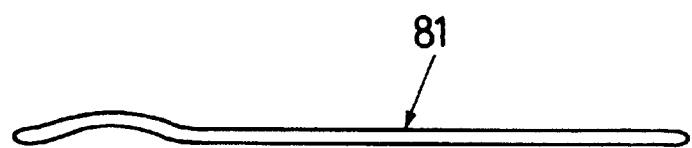
FIG. 22 is a front view of an example of an adjust pin provided with a bent part formed in a curved shape at one end thereof.

Sixth Embodiment: FIGS. 18 and 19

This is another embodiment of a wrist watch band connection structure according to the invention, described next with reference to FIGS. 18 and 19.

FIG. 18 is a schematic illustration, similar to FIG. 17, illustrating another embodiment of the wrist watch band connection structure according to the invention, and parts corresponding to those in FIG. 17 are denoted by like reference numerals.

As was the case of the fifth embodiment of the invention described with reference to FIG. 17, the wrist watch band connection structure according to this embodiment is provided with connecting through-holes 47, 48 and a connecting through-hole 49 of a protrusion, formed in blocks 42. They all have a bore identical in size throughout the entire length, but differs from the fifth embodiment in that the bore is rendered slightly greater than the diameter of the adjust pin 51 so as to cause a portion of the adjust pin 5 1, other than a bent part 5, to undergo flexure.

A "displacement vs. force" curve of the spring force of the adjust pin With the bore as described above and the same of an extraction force thereof, based on results of tests conducted, are shown in FIG. 19.

According to the results of the tests, the "displacement vs. force" curve of the spring force of the adjust pin 51 is nearly the same as that shown in FIG. 15.

Meanwhile, when conducting the test for measuring the extraction force of the adjust pin 51, a plurality of jigs with holes of bores in different sizes were provided. Each bore was consistent in size from one end to the other end, and prepared on the assumption that the connecting through-holes 47, 48 and the connecting through-hole 49 of the protrusion have a bore identical in size. A measurement was made of the extraction force when the adjust pin 51 was inserted into the holes of the respective jigs, and then pushed out thereof with a longitudinal portion of the adjust pin 51, on the opposite side of a bent part 5.

Results of the measurements are shown in FIG. 19. In comparing the results of the measurement with those shown in FIG. 15, it has been found that, in contrast to the characteristics of those for the fourth embodiment, there exists a region where the curve for the extraction force has a smaller gradient in the range of smaller displacements.

Such data for this region is presumably attributable to the possibility that when the adjust pin is inserted into the holes, it is in a region where the bore of the respective holes is fairly large relative to the diameter 1 mm of the adjust pin, and consequently, there is a large clearance between the longitudinal portion of the adjust pin, other than the bent part 5, and an inner wall face of the respective holes in which the longitudinal portion of the adjust pin is inserted, so that the longitudinal portion of the adjust pin having lower rigidity and being susceptible to buckling, as it is fairly longer than the bent part 5, underwent flexure first.

Subsequently, after the longitudinal portion of the adjust pin, other than the bent part 5, is subjected to sufficient flexure, the bent part 5 too undergoes flexure gradually, and consequently, there is a tendency for a sudden increase in the extraction force. Hence, with this embodiment, taking into account the flexure of the longitudinal portion of the adjust pin in the initial stage, there is a need to design the maximum height $H_{max}$ of the adjust pin 51, and respective bore sizes of the connecting through-holes 47, 48 and the connecting through-hole 49 of the protrusion, formed in respective blocks 42 making up a wrist watch band.

For example, by designing the amount of displacement of the bent part 5 of the adjust pin 51 at 0.2 mm, it is possible to cause a force in the superelastic region to act, and to obtain an extraction force as stable as that for the embodiment described with reference to FIG. 9.

Preferred Specific Embodiments

Among the embodiments of the invention, one using the adjust pin having the bent part formed in a curved shape, that is, the adjust pin in an angle-bracket shape at one portion thereof (like the shape shown in FIG. 1) has a constitution suitable to cause a spring force to act in the superelastic region because press working at a low temperature is applied with ease, enabling fluctuation in the maximum height $H_{max}$ of the bent part ($H_{max}$ shown in FIG. 11) to fall within a relatively small range.

Preferred specific examples of the adjust pin thus formed in the angle-branket shape are described hereinafter.

Table 1 shows test data on the adjust pin of various sizes according to the invention, formed in the angle-bracket shape as described above, indicating a relationship between ranges (of $H_{max}$) where the superelastic region of the adjust pin appears and the extraction force.

As is evident from equation (2) described in the foregoing, the spring force of the adjust pin is proportional to the wire diameter d raised to the fourth power, and is inversely proportional to the length L of the bent part, raised to the third power. It follows therefore that the adjust pin formed into a shape with the wire diameter d greater and the length L shorter will have higher rigidity. The higher the rigidity of the adjust pin, the greater the stress acting on the adjust pin when subjected to any deformation.

Table 1 indicates a trend that the higher the rigidity (the greater the wire diameter, and the shorter the length L) of the adjust pin, the narrower the superelastic region becomes, thereby increasing the extraction force in the superelastic region.

TABLE 1

| condition | block bore (mm) | pin wire diameter (mm) | L (mm) | $H_{max}$ range showing superelasticity (mm) | extraction force NiTi | extraction force NiTiCo |
|---|---|---|---|---|---|---|
| a | 0.9 | 0.8 | 0.9 | 0.92~0.95 | 1.6 | 2.08 |
| b | 0.9 | 0.8 | 1 | 0.95~1.01 | 1.2 | 1.56 |
| c | 0.85 | 0.7 | 1 | 0.89~0.97 | 0.76 | 0.988 |
| d | 1.2 | 1 | 1 | 1.23~1.28 | 5.35 | 6.955 |
| e | 1.2 | 1 | 2.0 | 1.5~1.65 | 2 | 2.6 |
| f | 1.2 | 1 | 3.7 | 1.7~1.9 | 1.1 | 1.43 |
| g | 1.3 | 1.2 | 3.7 | 1.6~1.8 | 4.5 | 5.85 |

In order to design the extraction force of the adjust pin and the width of the superelastic region at effective values, it is quite effective to design the wire diameter and the length L, as described above, within an effective range.

It is desirable that the width of the superelastic region is rendered greater than a scope of fluctuation in an amount of deformation which the adjust pin undergoes due to fluctuation in the dimensions of the adjust pin and the block bore size.

This is because the object of the invention is to prevent fluctuation of developed stress, taking advantage of superelasticity, even if there is fluctuation in the amount of deformation of the adjust pin, by designing such that deformation of the adjust pin remains in the superelastic region while the adjust pin is kept inserted in the block holes, so that the extraction force is stabilized. In case that the width of the superelastic region is designed narrow, the deformation of the adjust pin falls outside the superelastic region due to fluctuation thereof, and thereby the extraction force undergoes fluctuation with the result that an advantageous effect can not be expected.

Taking into account fluctuation in dimensions of the adjust pin formed by cold press working, and fluctuation in dimensions of the block bores (also in the position of the block bores) formed by drilling, it is desirable to design a range (the superelastic region) of the maximum height $H_{max}$ of the bent part of the adjust pin, showing superelasticity, at not less than 0.05 mm in width.

Further, a minimum extraction force in the order of 1 kgf is required not to allow the adjust pin to slip out of a wrist watch while in use. Accordingly, in view of the function of the adjust pin, the shape and so forth thereof needs to be designed such that the extraction force becomes not less than 1 kgf.

However, if the extraction force becomes too high, difficulty is encountered in pushing the adjust pin out of the respective blocks, thereby deteriorating efficiency of an operation to adjust a length of a wrist watch band. Accordingly, the upper limit of the extraction force is generally designed at about 7 kgf.

Thus, it is desirable to design the extraction force of the adjust pin in the range of about 1 kgf to 7 kgf.

Even if the length L of the bent part of the adjust pin as shown in FIG. 11 is less than 1 mm, it is possible to cause the extraction force in the superelastic region to fall within the range of about 1 kgf to 7 kgf. In this case, however, it becomes extremely difficult to work on the adjust pin.

That is, if the length L is designed at less than 1 mm, a shearing force at the time of press working becomes fairly large, thereby rendering the constituent material of the adjust pin susceptible to rupture.

Furthermore, if the length L becomes less than 1 mm, the superelastic region becomes narrower due to high rigidity. For example, in the case of the condition "a" given in Table 1, the superelastic region exists only in the width of 0.03 mm, ranging from 0.92 to 0.95 mm in value of the maximum height $H_{max}$, and consequently, taking into account fluctuation occurring at the time of working on the adjust pin, the effective utilization of the superelastic region becomes difficult.

In contrast, if the length L is longer than 1 mm, as shown in the case of the conditions "b" to "g", given in Table 1, the superelastic region has a width of 0.05 mm or more, and consequently, the superelastic region can be utilized effectively. Accordingly, two points of view, that is, the easiness at the time of press working on the adjust pin, and the scope of the width of the superelastic region, make it effective to render the length L of the bent part of the adjust pin 1 mm or longer.

In addition, since the adjust pin is inserted into the connecting through-holes in the respective arms of the wrist watch band, limits are imposed on the length L of the bent part by a design for the blocks. That is, the length L has to be shorter than a width of the respective arms.

Further, in the case of using the adjust pin formed in the angle-bracket shape, if the length L is too long, this will not only impose limits on suitable types of blocks for the wrist watch band but also it will render an operation to insert the adjust pin into the blocks difficult.

With a view to providing adaptability to common type blocks for a wrist watch band, and good operability at the time of inserting the adjust pin into the connecting through-holes of the respective blocks, it is desirable to render the length L not more than 3.7 mm.

Thus, it will be most effective to design the length L of the bent part of the adjust pin bent in the angle-bracket shape, according to the invention, within the range of 1 mm to 3.7 mm.

Further, as is evident from the case of the condition "c" given in Table 1, with the wire diameter of the adjust pin at less than 0.8 mm, the extraction force in the superelastic region becomes less than 1 kgf even if the length L is designed at 1 mm. It follows therefore that a wire diameter at not less than 0.8 mm is desirable.

Since rigidity of the adjust pin is raised by increasing the wire diameter, the extraction force in the superelastic region becomes greater, and the superelastic region becomes narrower. Assuming the case of designing the extraction force to not less than 1 kgf, the width of the superelastic region to not less than 0.05 mm, and the length L in the range of 1 mm to 3.7 mm, the condition described above can be met by designing the upper limit of the wire diameter at 1.2 mm as given under the condition "g" of Table 1.

That is, it is most effective to design the wire diameter of the adjust pin, formed in the angle-bracket shape, according to the invention, in the range of 0.8 mm to 1.2 mm.

Thus, if a wire with a diameter thereof ranging from 0.8 mm to 1.2 mm is used for the adjust pin, and the length L of the bent part (curved section) is designed in a range of 1 mm to 3.7 mm, this will be most effective.

In the case of nickel-titanium-cobalt (NiTiCo), its longitudinal elastic coefficient is 7450 kgf/mm$^2$, 1.3 times as large as that for nickel-titanium (NiTi), and consequently, NiTiCo is effective if used for the adjust pin in the case where a large spring force is required from the designing viewpoint or the wire diameter needs to be reduced while providing the same spring force.

Naturally there is some difference in the range of effective sizes between the adjust pins made of NiTi and NiTiCo, respectively, however, the ranges described above are effective for both alloys, and it can be said that these ranges are the most effective from an overall point of view.

Other Variations to the Embodiments

In describing various embodiments in the foregoing, it is mentioned that NiTi or NiTiCo are used as the constituent material for the adjust pin, however, materials other than those alloys, having superelasticity, such as CuAlNi, CuZnAl, and so forth, may be used as the constituent material as well.

Further, the adjust pin may be formed of a wire material not only in a circular shape in section but also in a rectangular shape, etc., other than the circular shape, in section.

In the respective embodiments as described above, the band blocks linked together by the respective adjust pins are for a solid band, however, the invention may be applied to a winding band using connecting lings, and so forth.

Further, in the respective embodiments as described above, a case wherein the band blocks are for the solid band, and are provided with a pair of arms separated by a recess is described by way of example, however, the present invention can be applied to band blocks, each provided with three or more arms, as well.

Figure 23:
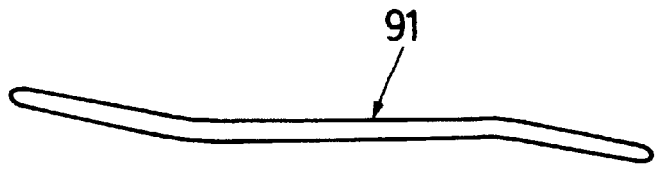
FIG. 23 is a front view of an example of an adjust pin provided with bent parts which are bent in different directions each other.

Furthermore, a shape of a curved section of the adjust pin is not limited to that described with reference to FIGS. 1 and 5, but the adjust pin may be formed in a shape like adjust pins 61, 71, 81, and 91 as shown in FIGS. 20 to 23, or may have the bent part formed at two locations as shown in FIG. 5 and FIG. 23.

With respect to adjust pins 61, 71, 81, and 91 formed in the shape as shown in FIGS. 20 to 23, an extraction force was checked, respectively, and as a result, it was found that a stable force of holding the adjust pins with respective blocks could be obtained as with the case of the embodiment described with reference to FIG. 11, and the insertion or extraction of the adjust pins could be also carried out with ease.

Further, any of the adjust pins 61, 71, 81, and 91 can be manufactured by the same steps as those of the method of manufacturing as described in the third embodiment.

There is no need for a particular shape of the bent part (the curved section) of the adjust pin even if it is other than that for the respective embodiment described, provided that the adjust pin is formed basically such that the stress in the superelastic region is caused to act on the connecting through-holes of the respective blocks in a connected state.

With the respective embodiments described hereinbefore, a case is described as a preferred example, wherein the adjust pin has both ends thereof, formed so as to have the semispheric curved surface, respectively, so as not to damage the connecting through-holes formed in the respective blocks when the adjust pin is inserted into or extracted out of the connecting through-holes of the respective blocks, however, it is not necessarily essential to render both ends of the adjust pin with a curved surface.

Furthermore, the steps of the method of manufacturing the adjust pin may be taken in the order of either cutting off—bending—heat treatment—barrel polishing or cutting off—barrel polishing—bending—heat treatment.

Figure 24:
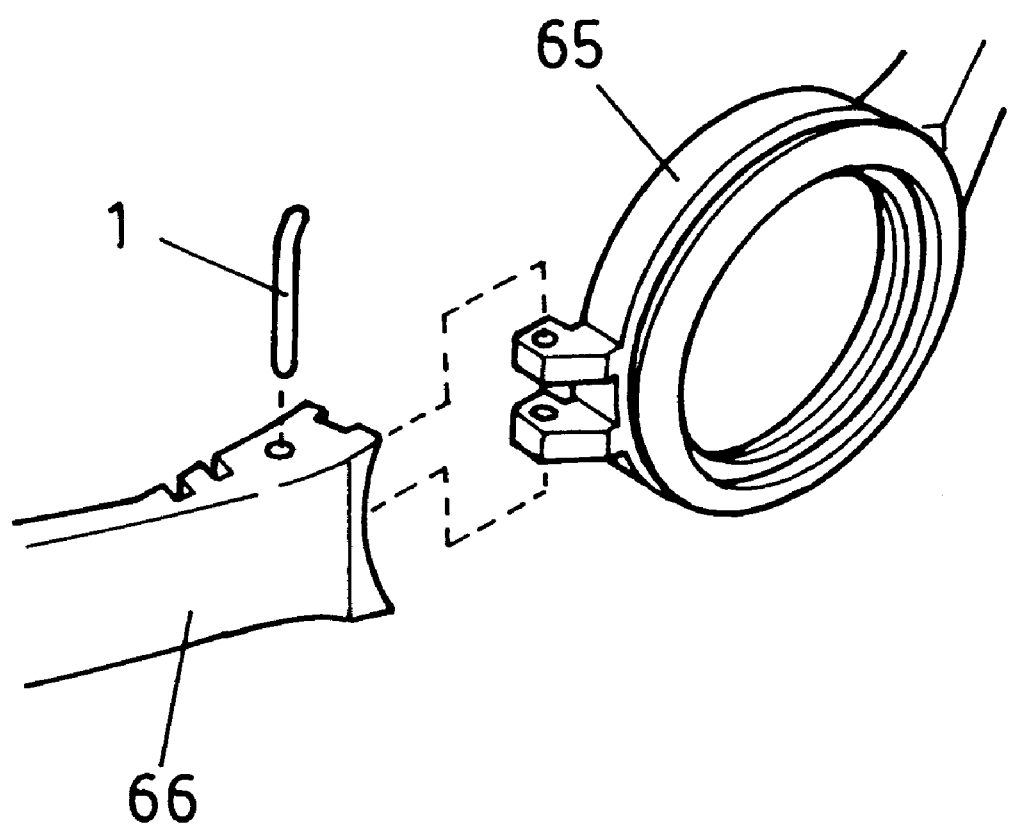
FIG. 24 is a perspective view showing a case wherein a wrist watch case is connected with a wrist watch band as an example of the application of the adjust pin, for other than connection of blocks of a wrist watch band.
Figure 25:
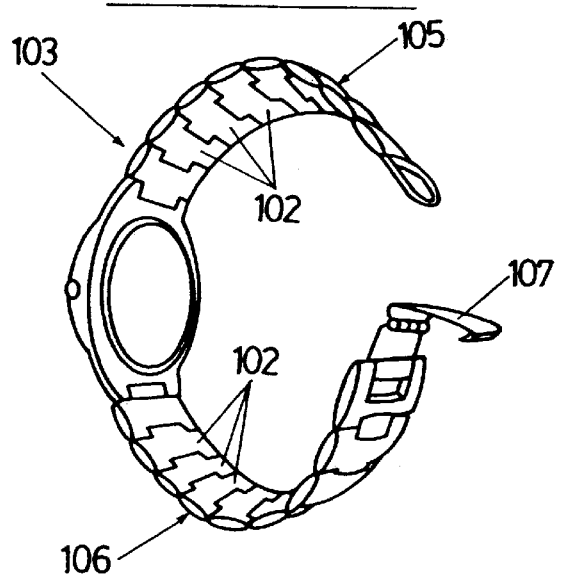
FIG. 25 is a perspective view of a conventional wrist watch provided with a metal band made up of metal blocks connected to each other.
Figure 26:
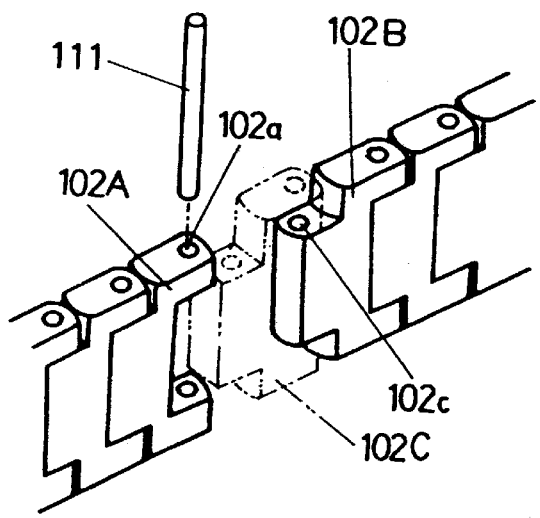
FIG. 26 is a perspective view of the conventional metal band illustrating a mechanism for adjusting length thereof.
Figure 2:
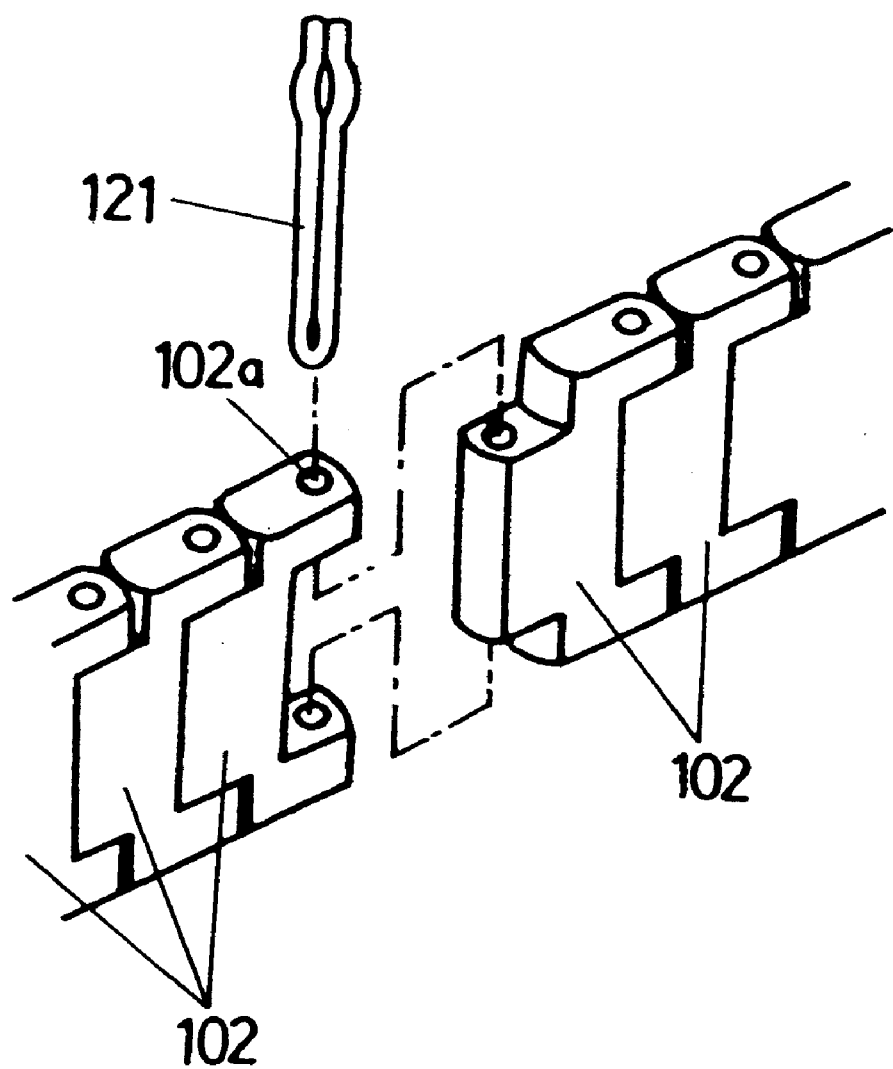

In addition, application of the invention is not limited to the adjust pin for use in connection of the blocks to each other, but the invention can be applied to a fixed pin or an adjust pin 1 shown in FIG. 24 for use in a connection structure (called an end-piece) for connecting a wrist watch case 65 with a wrist watch band 66 without causing any problem.

Thus, the adjust pin according to the invention can be used not only as a connection for band blocks, enabling adjustment of a length of a wrist watch band, but also as a connection between other parts of a wrist watch.

Industrial Applicability

As described in the foregoing, the wrist watch band adjust pin according to the invention can be prevented at all times from slipping out of the band blocks with a stable force of fitting the same into the connecting through-holes formed in the respective blocks even if there is fluctuation in the bore of the respective blocks while enabling a length of the wrist watch band to be adjusted with ease. Hence, widespread use thereof as a part of the wrist watch, for use in connecting the band blocks with each other in chain shape, is expected.

Further, since the wrist watch band adjust pin can be manufactured with ease by carrying out the method of manufacturing the wrist watch band adjust pin according to the invention, the method has a promising future as an effective method of manufacturing the wrist watch band adjust pin.

Furthermore, with the wrist watch band connection structure according to the invention, the band blocks can be stably connected in a chain-like shape while the length of the wrist watch band can be adjusted with ease. Hence, widespread use thereof as an effective wrist watch band connection structure is expected.

What is claimed is:

1. A wrist watch band adjust pin connecting adjoining blocks of a wrist watch band made up of the plurality of the blocks connected to each other in the form of a chain, wherein the adjust pin is formed from a metal having a superelastic region where stress remains constant against variation in strain, and provided with a bent part formed at least at one spot thereof, for causing the stress in the superelastic region to act on adjoining blocks in a state wherein the adjoining blocks are connected to each other.

2. The wrist watch band adjust pin according to claim 1, wherein the metal is an alloy composed mainly of nickel.titanium (NiTi) or nickel.titanium.cobalt (NiTiCo).

3. The wrist watch band adjust pin according to claim 2, wherein the adjust pin is in the range of 0.8 mm to 1.2 mm in wire diameter, and is provided with a bent part having a length in the range of 1 mm to 3.7 mm from a position thereof, on a side in contact with one of the adjoining blocks connected together, where the bent part starts bending, to a position thereof, at the maximum height, along the horizontal direction.

4. The wrist watch band adjust pin according to claim 1, wherein the bent part is a portion of the adjust pin, bent into a bow shape, so that the bow portion can be fitted into an inner wall face of the connecting through-holes formed in the adjoining blocks so as to be secured thereto.

5. The wrist watch band adjust pin according to claim 1, wherein the adjust pin is provided with a curved surface at both longitudinal ends thereof.

6. A method of manufacturing the wrist watch band adjust pin according to claim 1, comprising steps of providing a wire made of a metal having a superelastic region, providing at least one bend in said wire by a press, cutting off the wire to a length so as to include a bent part thereof, and rendering both longitudinal ends of the wire a curved-surface shape.

7. A method of manufacturing the wrist watch band adjust pin according to claim 1, comprising steps of providing a wire made of a metal having a superelastic region, cutting said wire to a desired length, providing at least one bend in the cut wire by use of a press, and rendering on both longitudinal ends of the wire a curved-surface shape.

8. A wrist watch band connection structure for connecting a plurality of blocks to each other in a chain-like shape, comprising the plurality of blocks, each provided with a recess formed on one edge thereof in the direction of a chain of a wrist watch band, and a protrusion formed on the other edge thereof, on the opposite side, so as to be fitted into a recess of an adjoining block, a connecting through-hole formed in a pair of arms of the respective blocks, separated by the recess, running along the direction of the width of the wrist watch band, respectively, and a connecting through-hole provided in the protrusion, formed to run in the direction parallel with the connecting through-hole formed in the pair of arms; wherein, by inserting an adjust pin made of a metal having a superelastic region where a stress remains constant against variation in strain into the connecting through-hole of the arms, respectively, and the connecting through-hole of the protrusion, in a state wherein the protrusion of one of the blocks is fitted into the recess of another of the blocks, adjoining to the former, the blocks adjoining to each other are detachably connected with each other, wherein the adjust pin is provided with a bent part formed so as to have the maximum height thereof greater than the bore of the connecting through-hole formed in one of the pair of arms, and when the adjust pin is inserted to a given position into the connecting through-hole formed in the pair of arms and the connecting through-hole of the protrusion, a stress occurring to the bent part of the adjust pin due to the bent part of the adjust pin undergoing flexure inside the connecting through-hole formed in one of the arms is designed to fall within the superelastic region, so that the adjust pin is secured to the adjoining blocks by a force of the stress.

9. The wrist watch band connection structure according to claim 8, wherein an enlarged bored section is formed at least at the inlet portion of the connecting through-hole in one of the pair of the arms such that dimensions between the inner wall faces thereof, opposite to each other in the diametrical direction, is rendered larger than the diameter of the connecting through-hole of the protrusion.

10. The wrist watch band connection structure according to claim 9, wherein the enlarged bored section is a stepped bored section formed at least at the inlet portion of the connecting through-hole of one of the pair of the arms such that dimensions between inner wall faces thereof, opposite to each other in the diametrical direction, is rendered larger than the diameter of the connecting through-hole of the protrusion.

11. The wrist watch band connection structure according to claim 9, wherein the enlarged bored section is formed throughout the entire region of the connecting through-hole of one of the pair of the arms, and the connecting through-hole in one of the arms is formed so as to have a bore such that, when the adjust pin is inserted to a given position into the connecting through-hole formed in the pair of the arms and the connecting through-hole of the protrusion, a stress occurring to the bent part of the adjust pin due to the bent part of the adjust pin undergoing flexure inside the connecting through-hole formed in one of the arms falls within the superelastic region, enabling the adjust pin to be secured to the adjoining blocks by a force of the stress while the connecting through-hole in the other of the pair of the arms is formed so as to have a bore slightly larger than the wire diameter of the adjust pin.

12. The wrist watch band connection structure according to claim 8, wherein the adjust pin is formed of an alloy composed mainly of nickel.titanium (NiTi) or nickel.titanium.cobalt (NiTiCo).

13. The wrist watch band connection structure according to claim 8, wherein the adjust pin of the wrist watch band connection structure is in the range of 0.8 mm to 1.2 mm in wire diameter, and is provided with a bent part having a length in the range of 1 mm to 3.7 mm from a position thereof, on the side in contact with the connecting through-hole, where the bent part starts bending, to a position thereof, at the maximum height, along the horizontal direction.

14. The wrist watch band connection structure according to claim 8, wherein the bent part of the adjust pin is formed by bending the adjust pin at a high temperature, or by applying heat treatment to the adjust pin after bending at a low temperature.

* * * * *